United States Patent
Marvel

(10) Patent No.: US 10,313,992 B2
(45) Date of Patent: Jun. 4, 2019

(54) SYSTEM AND METHOD FOR SYNCHRONIZING FREQUENCY HOPPING TRANSMITTERS, RECEIVERS, TRANSCEIVERS, REPEATERS AND OTHER RADIO NETWORKS

(71) Applicant: Eric Marvel, East Wenatchee, WA (US)

(72) Inventor: Eric Marvel, East Wenatchee, WA (US)

(*) Notice: Subject to any disclaimer, the term of this patent is extended or adjusted under 35 U.S.C. 154(b) by 0 days.

(21) Appl. No.: 15/898,415

(22) Filed: Feb. 16, 2018

(65) Prior Publication Data
US 2018/0249431 A1 Aug. 30, 2018

Related U.S. Application Data

(60) Provisional application No. 62/459,609, filed on Feb. 16, 2017.

(51) Int. Cl.
*H04B 1/713* (2011.01)
*H04W 56/00* (2009.01)
*H04B 1/7156* (2011.01)

(52) U.S. Cl.
CPC .......... *H04W 56/001* (2013.01); *H04B 1/713* (2013.01); *H04B 1/7156* (2013.01)

(58) Field of Classification Search
CPC ........................... H04W 56/001; H04B 1/713
See application file for complete search history.

(56) References Cited

U.S. PATENT DOCUMENTS

| | | | |
|---|---|---|---|
| 9,698,864 B2* | 7/2017 | Shaffer | H04B 1/7156 |
| 2018/0026674 A1* | 1/2018 | Lim | H04W 56/002 370/338 |

* cited by examiner

*Primary Examiner* — Dac V Ha
(74) *Attorney, Agent, or Firm* — Ariel S. Bentolila; Bay Area IP Group, LLC

(57) ABSTRACT

A method of synchronizing frequency hopping transmitters, receivers, transceivers, repeaters and other radio networks is provided, utilizing non-coordinated shared frequencies bands that synchronizes communications between transmitter(s) and receiver(s) via a pool of frequencies having a first group of frequencies being assigned to transmit for a specific duration per frequency per transmission and a second group of frequencies in which the total number of frequencies is a paired first factor of the first group's total number of frequencies or a paired first factor of any factor of the first group's total number of frequencies and which is then divided into transmit slots, the duration being a fraction of the first groups transmit duration and also being the corresponding paired second factor of the first groups total number of frequencies.

9 Claims, 16 Drawing Sheets

SYSTEM AND METHOD FOR SYNCHRONIZING FREQUENCY HOPPING TRANSMITTERS, RECEIVERS, TRANSCEIVERS, REPEATERS AND OTHER RADIO NETWORKS

CROSS-REFERENCE TO RELATED APPLICATIONS

The present Utility patent application claims priority benefit of the U.S. provisional application for patent Ser. No. 62/459,609 entitled "Novel method for fast acquisition and reacquisition in a frequency hopping radio system", filed on 16 Feb. 2017 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to radio communication. More particularly, certain embodiments of the invention relates to synchronization.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, an aspect of the prior art generally useful to be aware of is that in the field of radio communications and specifically frequency hopping systems typically within shared frequency bands with a multiplicity of uncoordinated devices competing for the same spectrum within the same geographic area, it may commonly be useful to practice interference prediction, mitigation, and avoidance when certain transmission characteristics are known such as the maximum duration a frequency may be transmitted by a given device within a given period of time and whether or not frequencies are used evenly on average over a given period of time. In the frequency hopping radio communications marketplace there is typically a growing demand for devices that can mitigate interference between competing devices on separate networks without the expense or complexity of an added frequency coordination component that must be administrated either in software or by the user themselves. Furthermore, real time data transmission and reception such as digital voice and other data transmission applications over frequency hopping systems within the same network are usually more efficient when synchronization may be fast and delays due to re-sending data are at a minimum.

With most frequency hopping systems using digital modulation techniques, typically as data rates increase the range may be reduced in the form of wider transmit bandwidth causing degraded receiver sensitivity due to widening the receive filter bandwidth, therefore an efficient payload to overhead ratio may be desired to maximize throughput while minimizing receive degradation due to widening the receive filter bandwidth. In mobile data and voice applications receiving devices commonly go in and out of range of the transmitted signal which may commonly cause hopping synchronization loss. Usually the less expensive the clock reference the shorter the duration of signal loss that will be tolerated before re-synchronization is required. Typically in frequency hopping systems that utilize a multitude of frequencies within their hop cycle, one method of synchronizing a frequency hopping receiver with a frequency hopping transmitter without the delays associated with the receiver scanning all frequencies in a particular hopset or waiting on one channel until that channel may be used within the hop cycle, may be for the receiver to tune to or scan one or more of a small number of predesignated channels from the hopset while the transmitter always begins transmission of the hopping cycle starting with that/those same frequencies before proceeding on to the rest of the cycle.

In order to keep frequency usage equally distributed over time the transmit duration of the frequencies used to start synchronization are commonly kept the same as non-synchronization transmissions. Usually this forces receiver scan times thus the delay time to synchronization to be directly proportional to the per frequency transmit duration of the particular frequency hopping system. Furthermore, if the receiver loses synchronization it must commonly wait until the hop cycle cycles back around to those start frequencies described above in order to regain synchronization. Another known solution may be for the receiver to hop at a much slower rate than the transmitter. The receiver hop dwell times will typically be the transmitter dwell time multiplied by the number of channels, however this can lead to significant synchronization delay as the number of designated hopping channels increases in a system. One way to solve the receive scan time issue may be to use multiple scanning receivers each coordinated to tune to different frequencies in order to speed up the scanning and thus the synchronization. This however may be costly and does not help to increase the payload data throughput efficiency on the transmit side.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

With reference to FIGS. 1A, 1B and 2.

With reference to FIGS. 1A to 3B and FIG. 5A.

With reference to FIGS. 5A and 5B.

With reference to FIGS. 1 to 3B, and 6A.

With reference to FIGS. 6A and 6B.

With reference to FIGS. 1A to 3B and 7A.

With reference to FIGS. 7A and 7B.

Figure 1A:
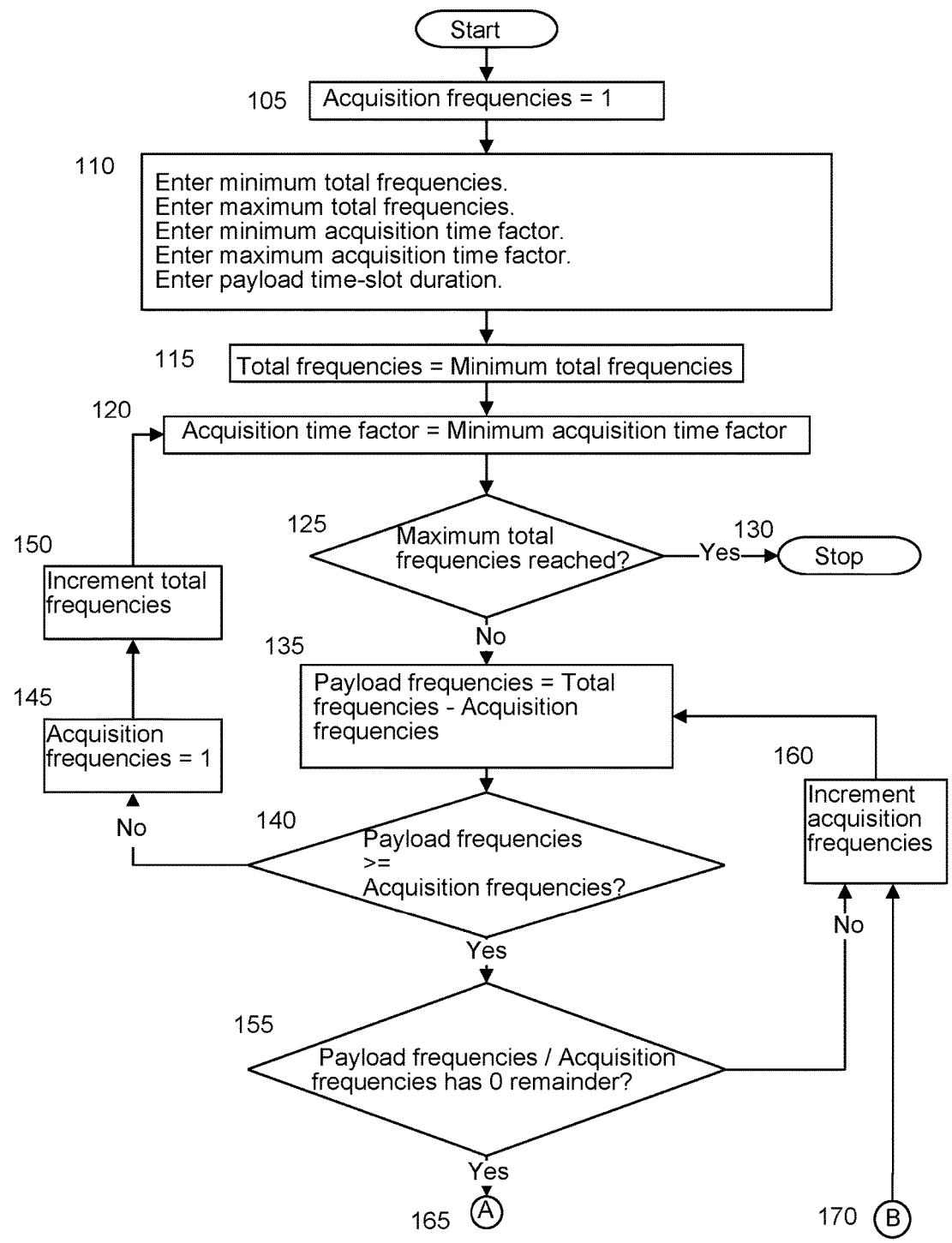
FIGS. 1A and 1B are flow charts illustrating an exemplary process to determine a hopping interleave ratio and timing to be implemented within a logic section of a radio transmitter, receiver, transceiver or repeater device, where 1B is a continuation of 1A, in accordance with an embodiment of the invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte *Mallory*, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc.* v. *Roadway Safety Servs., Inc.*, Civ. App. 96-1264, slip op. at 10 (Fed. Cir. Jul. 3, 1997) (unpublished) *Hybridtech* v. *Monoclonal Antibodies, Inc.*, 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co.* v. *Industrial Crating & Packing, Inc.*, 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re *Frye*, Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C.* v. *Vector Distribution Sys., Inc.*, 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See *Dana Corp.* v. *American Axle & Manufacturing, Inc.*, Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp.* v. *Medtronic AVE Inc.*, 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC* v. *Vector Distribution Sys., Inc.*, 347 F.3d 1314, 1322 (Fed. Cir. 2003); *Epcon Gas Sys., Inc.* v. *Bauer Compressors, Inc.*, 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp.* v. *Vaughan Co.*, 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp.* v. *Medtronic AVE, Inc.*, 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems* v. *Rockwood Retaining Walls, Inc.*, 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C.* v. *Vector Distrib. Sys., Inc.*, 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see *Epcon*, 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc.* v. *Bauer Compressors, Inc.*, 279 F.3d 1022 (Fed. Cir. 2002) (construing the terms "substantially constant" and "substantially below"); *Zodiac Pool Care, Inc.* v. *Hoffinger Indus., Inc.*, 206 F.3d 1408 (Fed. Cir. 2000) (construing the term "substantially inward"); *York Prods., Inc.* v. *Cent. Tractor Farm & Family Ctr.*, 99 F.3d 1568 (Fed. Cir. 1996) (construing the term "substantially the entire height thereof"); *Tex. Instruments Inc.* v. *Cypress Semiconductor Corp.*, 90 F.3d 1558 (Fed. Cir. 1996) (construing the term "substantially in the common plane"). In conducting their analysis, the court instructed to begin with the ordinary meaning of the claim terms to one of ordinary skill in the art. *Prima Tek*, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac,* 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.,* 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.,* 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp.* v. *Gabriel Elecs. Inc.,* 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.,* 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.,* 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter.", e.g., see *Pall Corp.* v. *Micron Seps.,* 66 F.3d 1211, 1217, 36 USPQ2d 1225, 1229 (Fed. Cir. 1995); see, e.g., *Andrew Corp.* v. *Gabriel Elecs. Inc.,* 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte *Mallory,* 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re *Hutchison,* 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology

The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see *Norian Corp.* v *Stryker Corp.*, 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hardwired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

An embodiment of the present invention may provide improved synchronizing, for at least one frequency hopping transmitter to at least one frequency hopping receiver wherein designated acquisition frequencies and their transmit times may be reduced to a fraction of the payload frequencies transmit time and interleaved throughout the transmit hopping pattern, such that hopping synchronization data on those acquisition channels may be distributed throughout the hop cycle. The receiver scan time and thus delay of synchronization may be reduced due to the smaller number and shorter transmit duration of the acquisition channels as well as optional repeated identification data sent on the acquisition channels. Furthermore, the receiver may lose synchronization and reestablish synchronization without waiting for a full hopping cycle or restart of transmission from the transmitter.

Furthermore, this invention may provide transmitting durations of acquisition frequencies based on factors of total payload frequencies. Furthermore, this invention may provide acquisition frequencies which may be distributed/interleaved with payload frequencies throughout hopping cycle. Furthermore, this invention may provide various interleave patterns which may be created from a single defined ratio. Furthermore, this invention may provide all frequencies which may be used evenly over time. Furthermore, this invention may provide slots which may be divided to create simplex, Time Division Duplex, Time Division Multiple Access or combination thereof without affecting ratio, balance or interleaving pattern. Furthermore, this invention may provide transmitting hopping synchronization on short duration acquisition channels to maximize throughput of payload channels. Furthermore, this invention may provide transmission of a first repeating network ID data sequence on acquisition frequencies followed by an optional longer typically more detailed or specific non-repeating network ID data sequence. Furthermore, this invention may provide a receiver scan dwell time formula and sequence that may minimize receiver dwell time and chances of missed acquisition data.

Although for the following figures only one interleave, timing and frequency pattern will be described in detail for use in five different system types (half duplex, half duplex time division multiple access, time division duplex, time division duplex with time division multiple access and repeater bridge), many timing and interleave patterns and modes of operation as well as various modifications and improvements relative to system requirements can be made by a person skilled in the art without departing from the scope of the present invention.

Figure 1B:
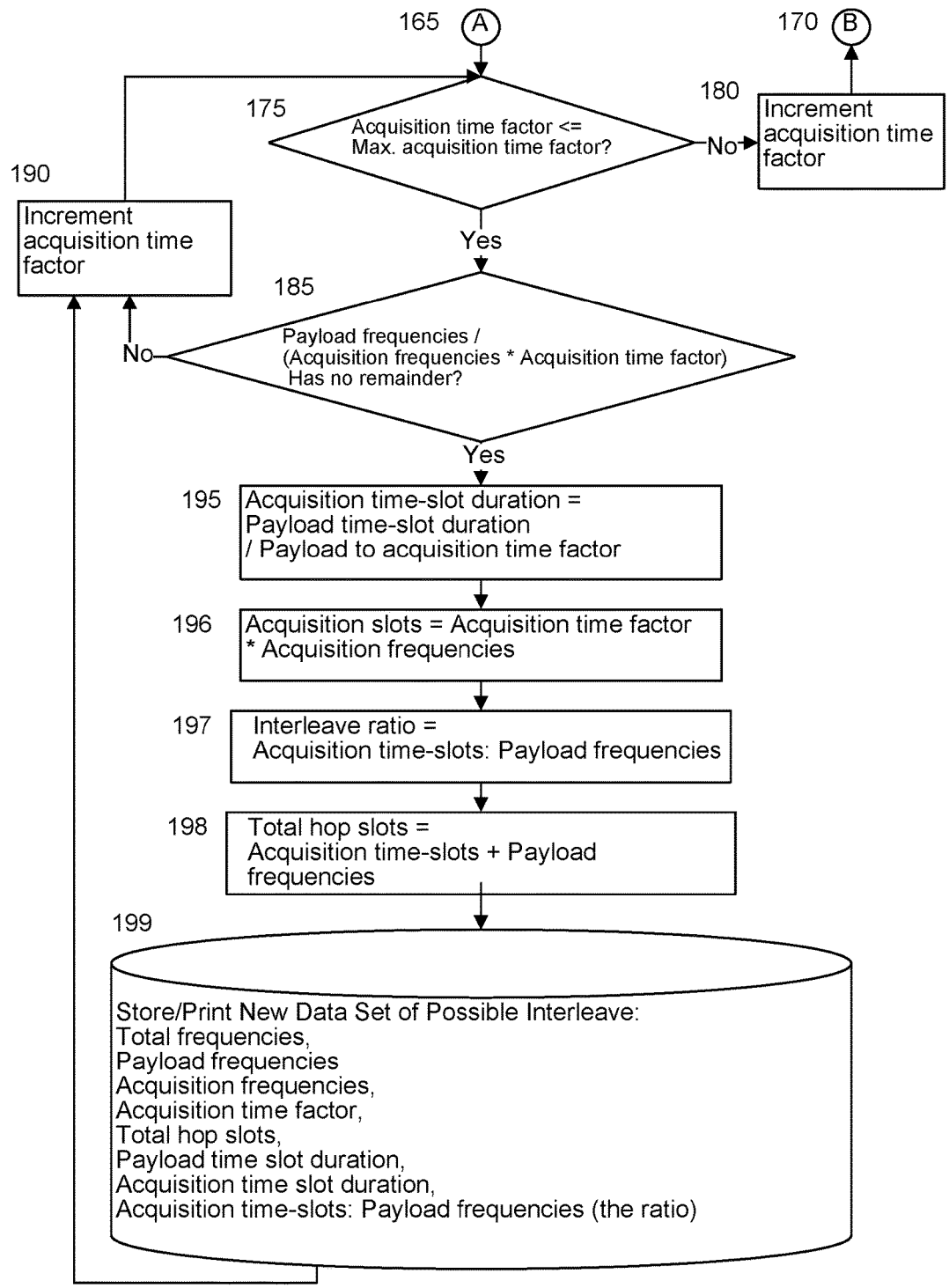

FIGS. 1A and 1B are flow charts illustrating an exemplary process to determine a hopping interleave ratio and timing to be implemented within a logic section of a radio transmitter, receiver, transceiver or repeater device, where 1B is a continuation of 1A, in accordance with an embodiment of the invention. Those skilled in the art will appreciate that the exemplary steps and flow show may be altered depending upon the needs of the particular application, and in light of the teachings of the present invention. By way of example, and not limitation, steps in 1A and 1B may be reordered and the output parameters, tests and input parameters may be swapped depending, at least part, on what the known factors are from the system designers point of view. For example, without limitation, from a regulatory compliance standpoint a designer might use FIGS. 1A & 1B as illustrated with inputs being "Total Frequencies" and maximum allowed "Payload Time Slot Duration". However from an efficiency standpoint the inputs could be "Total Hop Slots" and "Acquisition Time Factor" with "Total Frequencies" and maximum allowed "Payload Time Slot Duration" being some of the output variables. Those skilled in the art will readily recognize the right balance between these, and other, trade-off considerations depending upon the needs of the particular application. While it would not be practical or necessary to illustrate the wide combinatorial diversity of input and output options along with possible reordering of steps, a helpful guidance for the system designer to consider is that many practical alternatives to the present embodiment may be created that generally have formula/steps, which generate fractional times and subgroups of frequencies (acquisition) whose transmit duration and quantity are paired factors of the payload transmit duration and quantity of payload frequencies resulting in equal transmission (use) on all frequencies upon completing a full hop cycle (all hop acquisition and payload slots have been transmitted once without repeating or duplication). With reference to FIG. 1A, in a Step 105 the quantity of acquisition frequencies may be set to one. Many practical embodiments of the present invention should have at least one Acquisition frequency assigned. In FIGS. 1A and 1B there are two places where the number of acquisition frequencies is reset to the minimum of 1. In a Step 110 a minimum of 1 and maximum of 1,000,000 quantity of total frequencies may be selected, a minimum of 1 and a maximum of 60,000 for the acquisition time factor may be selected, and a payload time slot duration of 0.2 milliseconds to 120,000 milliseconds may be entered. In a Step 115 the quantity of total frequencies may be set to the minimum quantity of total frequencies entered from a Step 110. In Step 120 the acquisition time factor may be set to the minimum acquisition time factor entered from a Step 120. In a Step 125 total frequencies may be tested to see if they have exceeded the maximum total frequencies, if they have passed, In a Step 135 the remaining channels may be calculated to be payload channels, where payload frequencies may be equal to the total frequencies minus the acquisition frequencies. In a Step 140 the number of acquisition frequencies may be tested to not exceed or equal the number of payload frequencies. If the test fails the acquisition frequencies may be reset 145 and the quantity of total frequencies may be incremented by 1 150 and return to Step 125. If Step 140 passes, in a Step 155 the number of acquisition frequencies may be tested to be a factor of the number of payload frequencies in the hopset. If the test fails the quantity of acquisition frequencies is incremented by 1 160 and Step 135 may be repeated.

With reference to FIGS. 1A and 1B, if test FIG. 1A 155 passes then through FIGS. 1A's and 1B's 165 in FIG. 1B a Step 175 the acquisition time factor may be tested to not exceed maximum selected acquisition time factor. With reference to FIGS. 1A and 1B, if FIG. 1B 175 fails the acquisition time factor may be reset to minimum acquisition time factor in a Step 180, and through FIGS. 1A and 1B 170 the quantity of acquisition frequencies may be incremented by 1 in FIG. 1A Step 160. In a Step 185 payload frequencies may be divided by the product of multiplying the acquisition frequencies and acquisition time to test if they factor. If test 185 fails, the acquisition time factor may be incremented by 1 190 and Step 175 may be repeated. If test 185 passes, in a Step 195 a payload time slot duration may be divided by the acquisition time factor to obtain the acquisition time slot duration. In a Step 196 the number of acquisition frequencies may then be multiplied by the acquisition time factor to obtain the total number of acquisition time slots. In a Step 197 the interleave ratio may be determined by the acquisition time slots compared to the payload frequencies. In a Step 198 the total number of payload frequencies may be added to the total number of acquisition time slots to become the total number of hop slots in the hop cycle. The total hop slots, interleave ratio, total frequencies, payload frequencies and any optional other data calculated may then all be stored onto database 199 and used to form one possible hopping sequence and timing solution. The acquisition time factor may then be incremented by 1 in a Step 190 and Step 175 may be repeated. It may be appreciated that many such combinations may be generated depending on input parameters for consideration based on unique system requirements. Using this formula and block diagram it may show that many different patterns, ratios and timings may be output for use in the method and implemented according to best choice for a given system.

Figure 2:
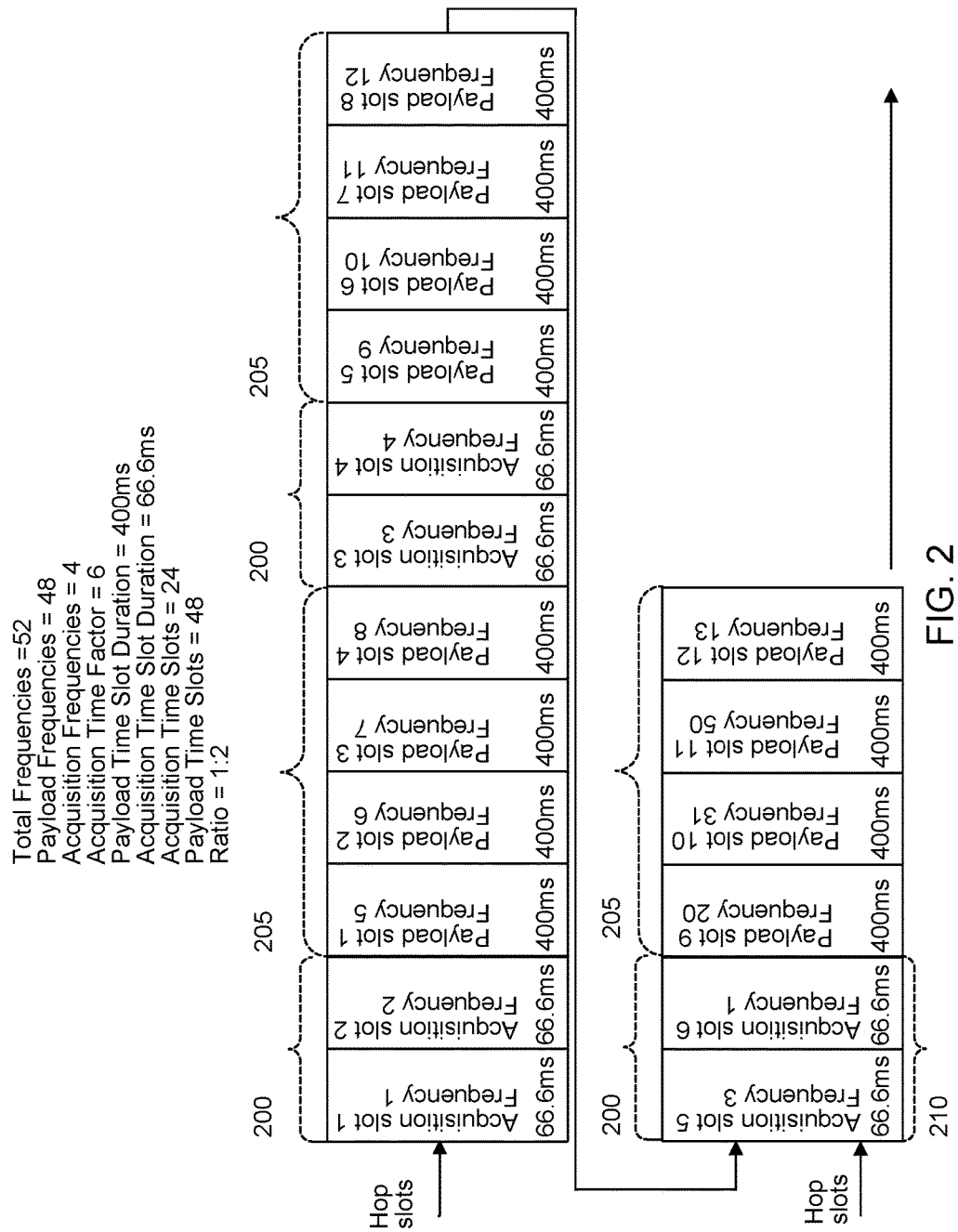
FIG. 2 illustrates an exemplary possible hopping pattern resulting from the steps in FIGS. 1A and 1B, in accordance with an embodiment of the invention.

With reference to FIGS. 1A, 1B and 2, FIG. 2 illustrates an exemplary possible hopping pattern resulting from the steps in FIGS. 1A and 1B, in accordance with an embodiment of the invention. With reference to FIGS. 1A and 1B, it will be appreciated that the steps in FIGS. 1A and 1B may create numerous possibilities that may fall within the scope of the present invention, from which an optimum configuration may be chosen based on individual system requirements including, without limitation, balancing trade-offs between speed of synchronization/re-synchronization vs acquisition slot robustness vs payload throughput efficiency vs transmission channel bandwidth vs regulatory requirements; therefore, a pattern representing a ratio of one acquisition to two payload structured as two acquisition slots followed by four payload slots with a payload slot duration of 400 ms 205 and an acquisition slot duration of 66.6 ms 200 is shown as an example. With reference to FIGS. 1A and 1B, the ratio and hop slots from the steps in FIGS. 1A and 1B may be used to form interleaved frames consisting of acquisition slots as depicted 200 and payload slots as depicted 205 which may be contiguously connected to become a hop cycle. The hop cycle may be complete and may be re-cycled when all hop slots have been transmitted. The acquisition slots 200 & 205 may be ordered within the frames and cycle using techniques so that maximum frequency diversity may occur with regards to adjacent slots 210. sequential, random, Pseudorandom or any other non sequential ordering methods may also be used when ordering acquisition slots, payload or both depending on system requirements as regulatory and encryption/security. Acquisition frequencies 200 may be repeated throughout the hop cycle while payload frequencies 205 may be transmitted only once per hop cycle.

Figure 3A:
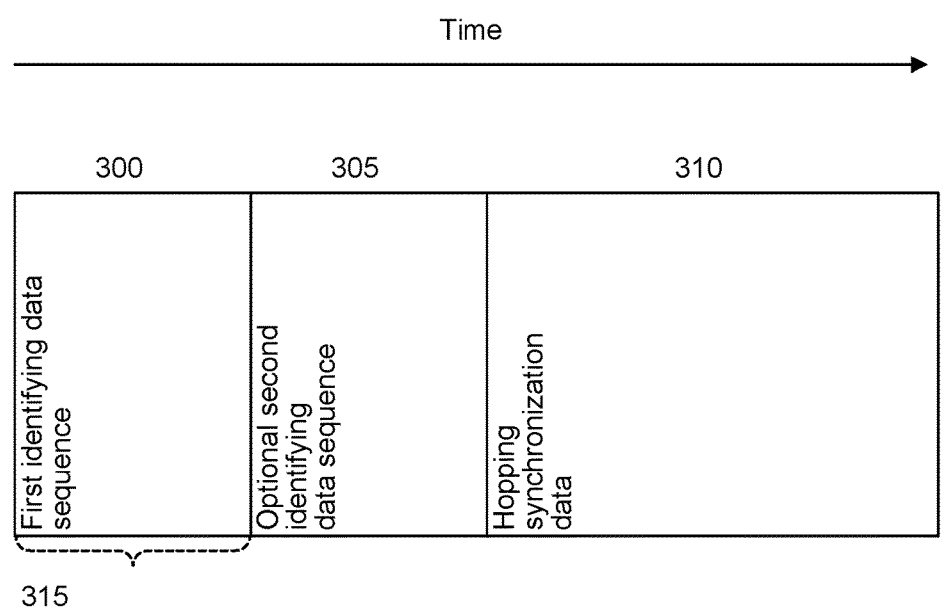
FIG. 3A illustrates an exemplary block diagram of data transmitted within a typical acquisition slot, in accordance with an embodiment of the invention.

FIG. 3A illustrates an exemplary block diagram of data transmitted within a typical acquisition slot, in accordance with an embodiment of the invention. A first identifying data sequence from 2 to 500 bits long 300 may be sent repetitively for at least a minimum duration as defined by receiver detect time plus receiver blank or tune time (hardware limited) multiplied by the total number of acquisition frequencies in a hop cycle 315. This may be followed by an optional second identifying data sequence 4 to 1000 bits long 305, which may be followed by hopping synchronization data 310. It should be noted that while identifying data sequence 305 is optional in many practical applications it may be important for useful operation, first identifying data sequence 300/315 and hop cycle 310 may particularly important to proper functioning.

Figure 3B:
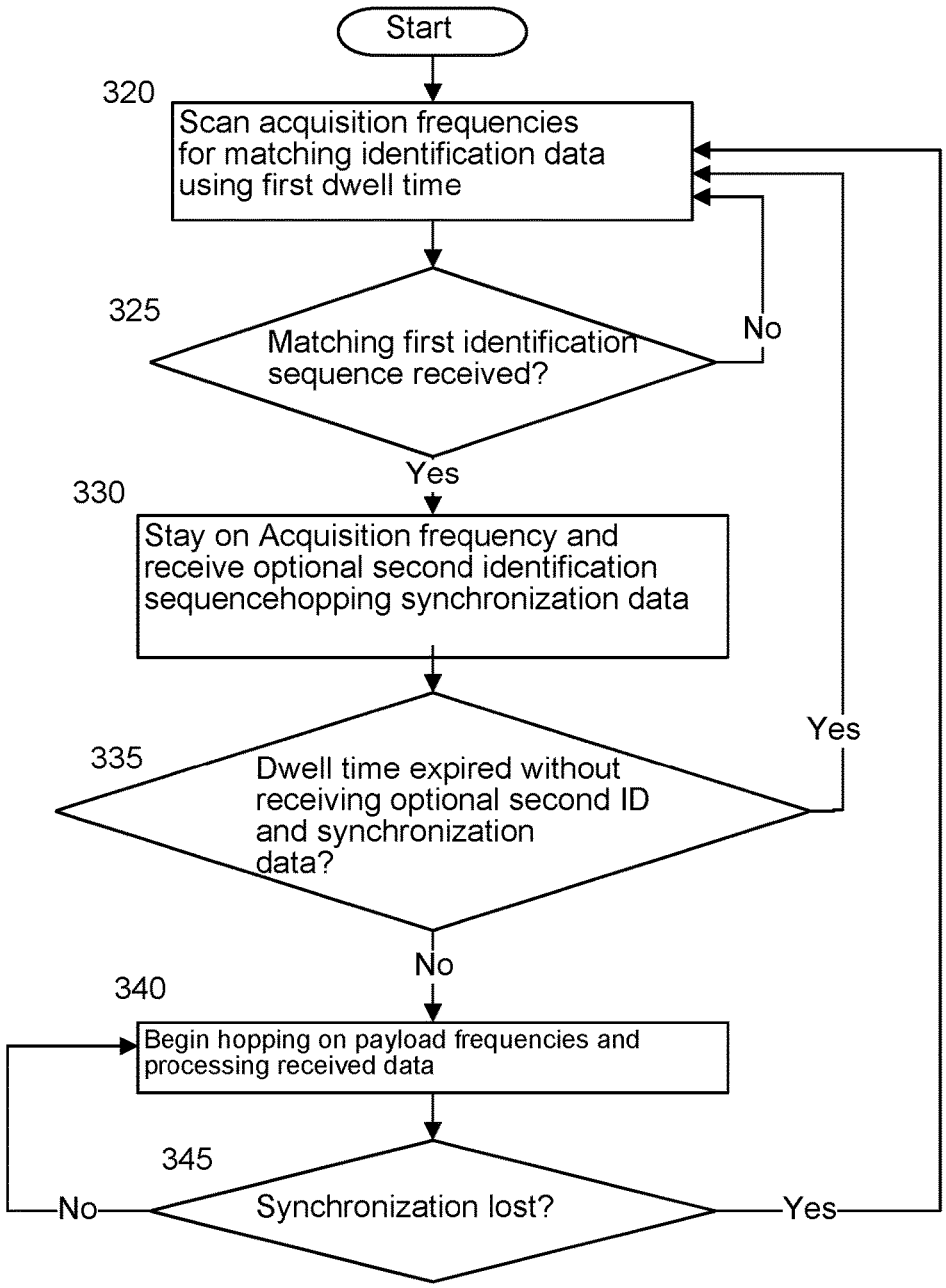
FIG. 3B illustrates an exemplary flowchart for receiver scanning of the transmitted acquisition channels and subsequent synchronization, in accordance with an embodiment of the invention.

FIG. 3B illustrates an exemplary flowchart for receiver scanning of the transmitted acquisition channels and subsequent synchronization, in accordance with an embodiment of the invention. With reference to FIGS. 1A, 1B, and 3A, in a Step 320 the receiver may scan acquisition frequency (ies) as determined in FIGS. 1A and 1B. In Step 320, a receiver may scan each acquisition frequency monitoring for a first dwell duration from 0.5 to 2.5 times the transmit duration of a single instance of the first identifying data sequence from 300 sufficient to, at a minimum have a 50% or higher probability of detecting a match of the first network identification data sequence. In a Step 325 if at the end of monitoring the first dwell duration no valid network data has been detected, a next acquisition frequency may be monitored, then when all frequencies are scanned a scanning cycle Step 320 may be repeated. In Step 325 if a valid network identification has been detected, then in a Step 330 data reception may be continued on same frequency and if the optional second network identification sequence is implemented-optional second network identification matching data sequence and hopping synchronization data may be received. In a Step 335 if an optional second network identification matching data sequence or hopping synchronization data is not received within a preset second dwell duration from 0.5 to 2.5 times the transmit duration of the second identifying data sequence from 305 sufficient to, at a minimum many practical applications have a 50% or higher probability of detecting a match of the optional second network identification data sequence, then acquisition frequency scanning may be resumed and Step 320 is repeated. In a Step 335, if an optional second network identification matching data sequence and or hopping synchronization data is determined to be valid before the preset dwell time expires, then a controller may reconstruct a hopping pattern and all elements necessary to synchronize with a transmitter from either the data received on the acquisition channel or from it's own presets in memory or from a combination of both. In a Step 340, a receiver may begin to synchronize reception on payload channels. payload slots may optionally include a network identification data sequence as well as other overhead/control information depending on trade-offs between bandwidth efficiency vs network security and requirements for additional overhead. In many practical applications, synchronization loss may be set from a minimum of missing 1 payload slot up to a maximum of missing 1000 payload slots or corresponding duration depending on a trade-off between synchronization loss tenacity vs speed of re-acquisition. If synchronization is lost due to termination of transmission or end of transmission data sequence sent from transmitting device, loss of payload or acquisition slot data decoding and subsequent timeout, hardware failure or user intervention, the receiver may revert back to scanning the acquisition frequencies and Step 320 may be repeated.

Figure 4A:
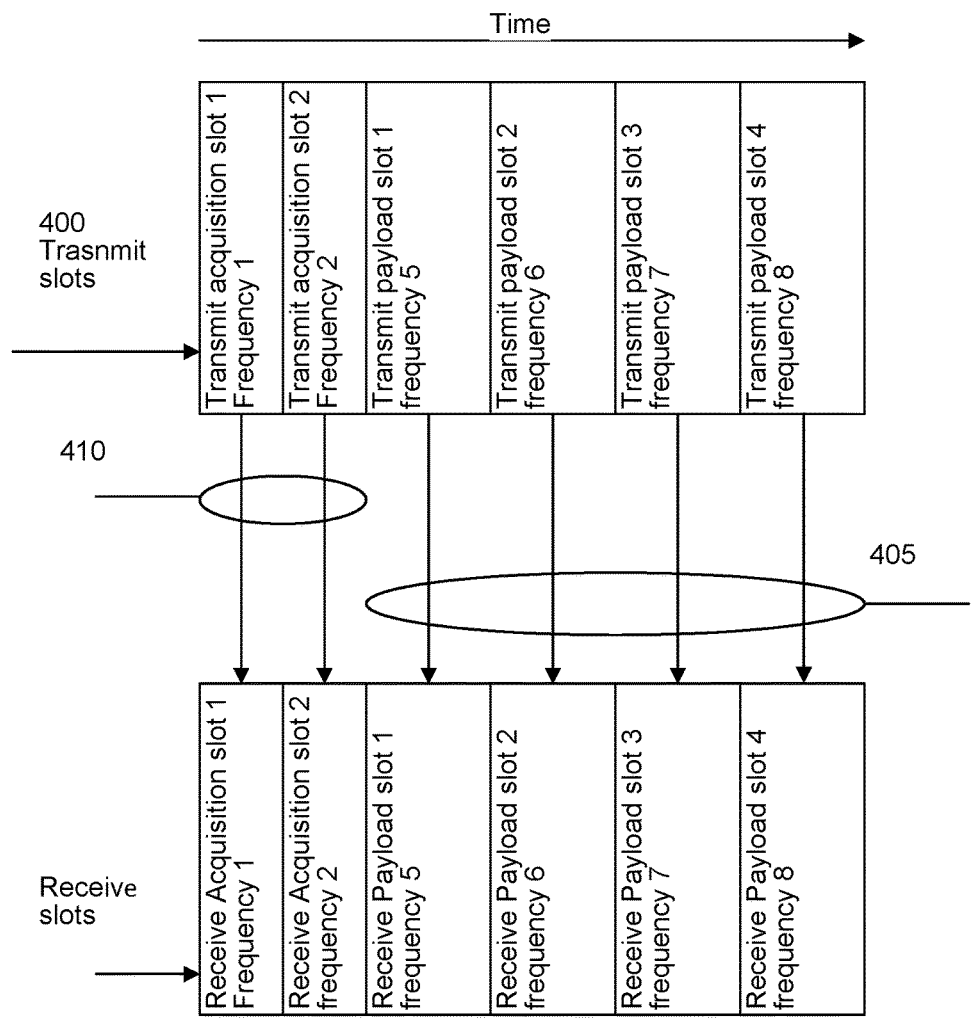
FIG. 4A illustrates an exemplary block diagram embodiment of a hopping pattern used in half duplex communications with corresponding transmission signal flow, in accordance with an embodiment of the invention.

FIG. 4A illustrates an exemplary block diagram embodiment of a hopping pattern used in half duplex communications with corresponding transmission signal flow, in accordance with an embodiment of the invention. Synchronization may be established as described above via acquisition slots 410 only one received acquisition slot is necessary to be received for synchronization to occur. A transmit hopping pattern 400 may be continued until all hop slots have been utilized and repeated if necessary until transmission is terminated. Once synchronized, a receiver may hop in time with transmitted payload slots 405. While hopping is synchronized, the receiver may tune in time with the transmit payload slots 405. It may not be required that the receiver tune to acquisition slots 410 once synchronization is established.

Figure 4B:
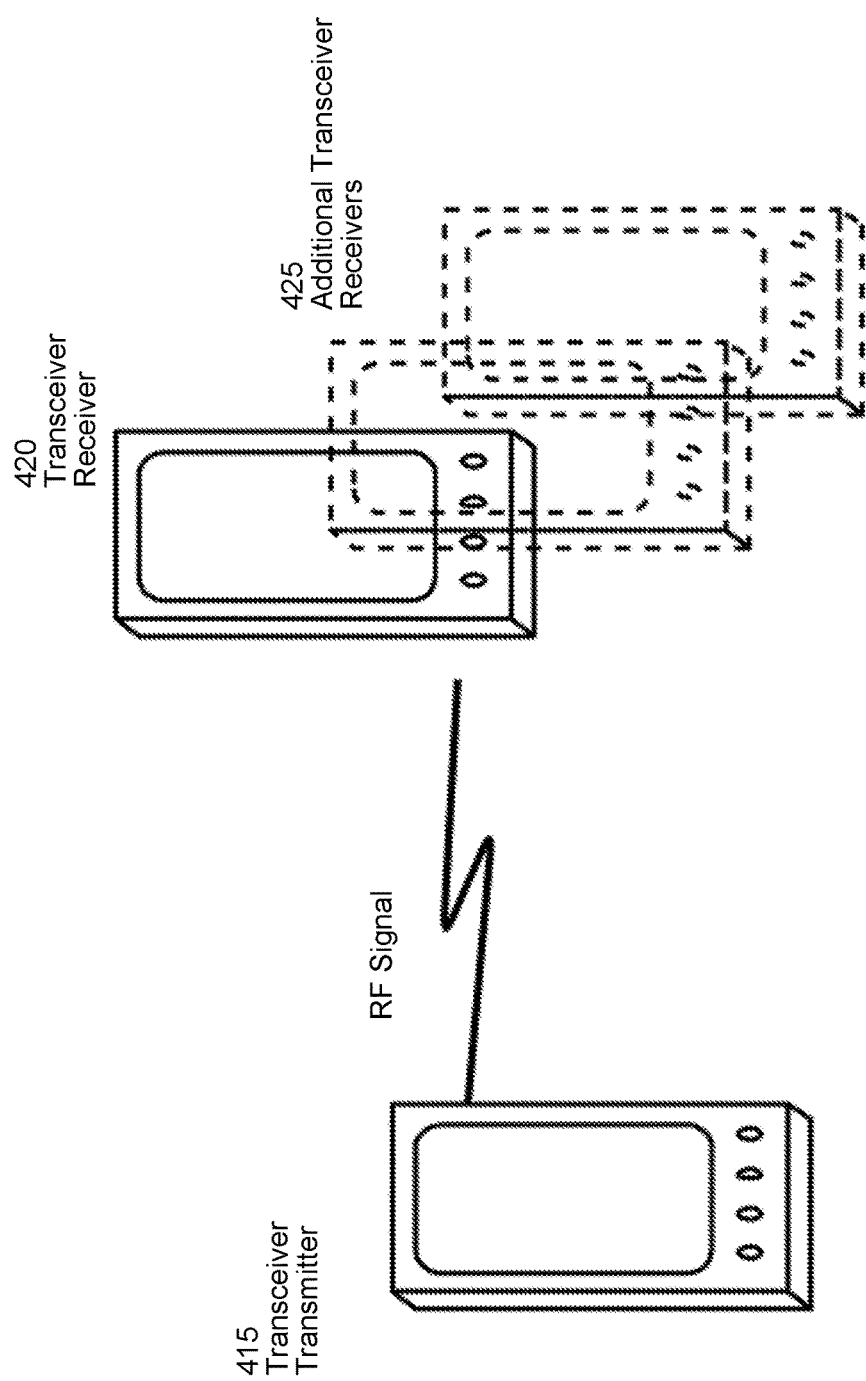
FIG. 4B illustrates exemplary user level radio transceivers utilizing the invention, in accordance with an embodiment of the invention.

FIG. 4B illustrates exemplary user level radio transceivers utilizing the invention, in accordance with an embodiment of the invention. With reference to FIGS. 1A to 4A, FIG. 4B illustrates the methods described in FIGS. 1A to 4A applied to transmissions of half duplex communications 415 and reception 420 as well as simultaneous multi-unit reception 425.

With reference to FIGS. 1A to 3B and FIG. 5A, FIG. 5A illustrates an exemplary block diagram of a single frame according to the method as described in the detailed descriptions for FIGS. 1A to 3B when implemented in a half duplex 2 position time division multiple access configuration, in accordance with an embodiment of the invention. With reference to FIGS. 1A to 3B, transmit hop slots 505 according to the detailed descriptions of FIGS. 1A to 3B, may be partitioned into multiple access time slots 510 by dividing a transmit duration within a hop slot by a number of multiple access slots desired from 2 to 1000. With reference to FIGS. 1A to 3B and 5A, receive hop slots 515 according to the detailed descriptions of FIGS. 1A to 3B may be partitioned into multiple access time slots 520 by dividing the transmit duration within the hop slot by the number of multiple access slots matching the transmitter slots 510 from 2 to 1000. Optional detection of the multiple access slot position transmission in use by the other in range multiple access transceiver's receivers using the same hop set with different network or system identification addressing may enable them to automatically select and transmit on an available multiple access slot as a further interference mitigation without user intervention/selection.

Figure 5A:
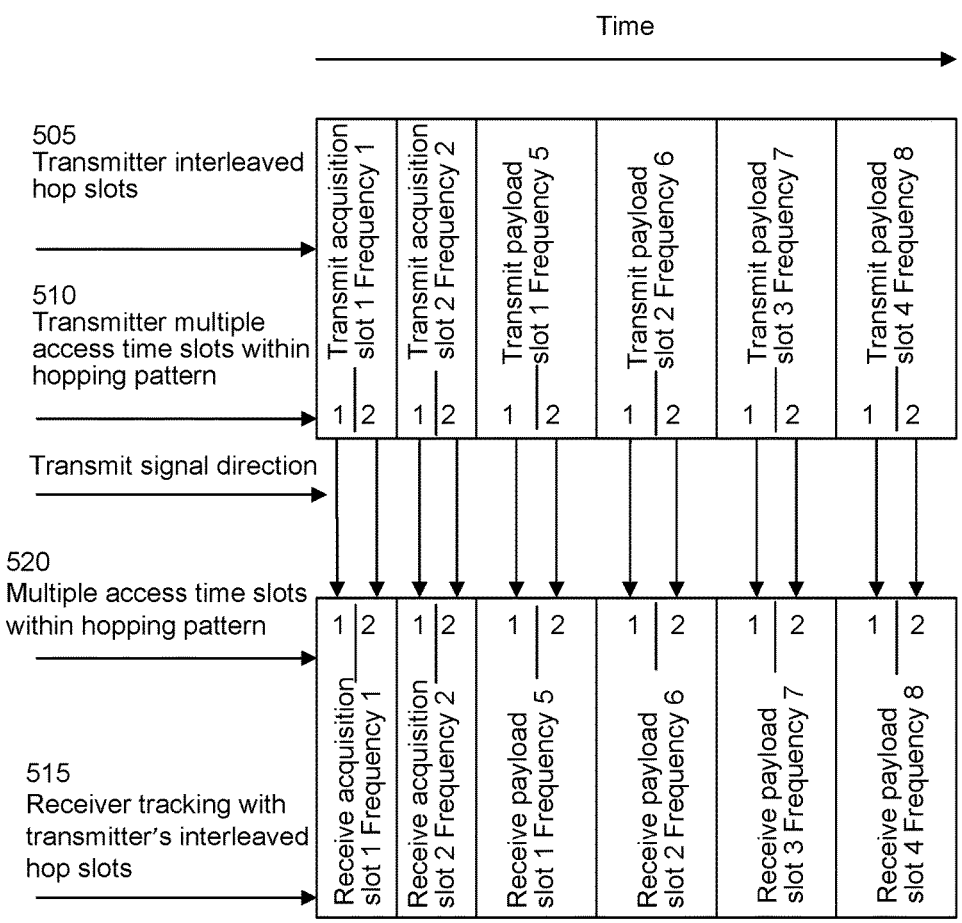
FIG. 5A illustrates an exemplary block diagram of a single frame according to the method as described in the detailed descriptions for FIGS. 1A to 3B when implemented in a half duplex 2 position time division multiple access configuration, in accordance with an embodiment of the invention.
Figure 5B:
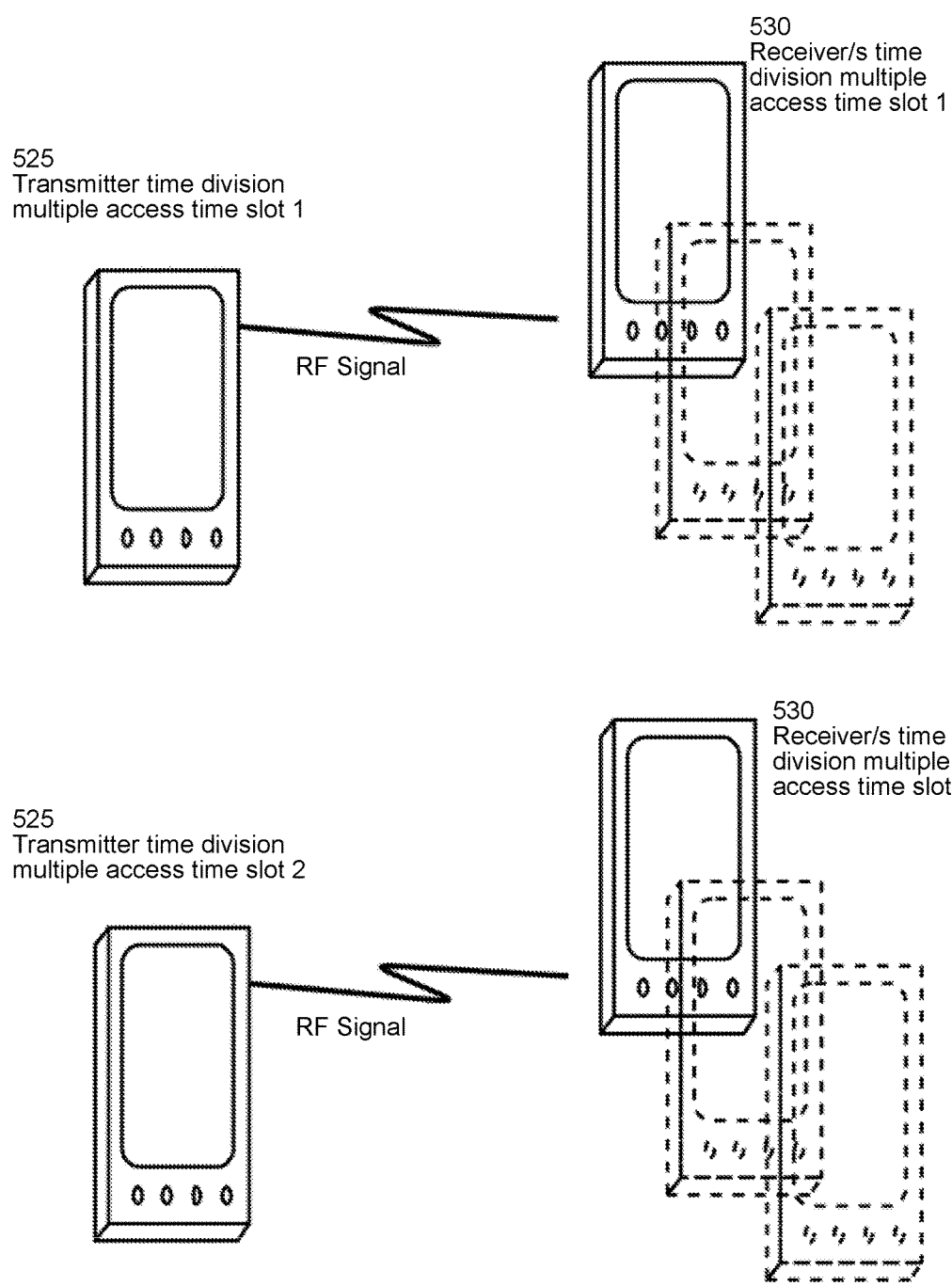
FIG. 5B illustrates exemplary radio transceivers implementing the method described in FIG. 5A, in accordance with an embodiment of the invention.

With reference to FIGS. 5A and 5B, FIG. 5B illustrates exemplary radio transceivers implementing the method described in FIG. 5A, in accordance with an embodiment of the invention. Frequency hopping time division multiple access half duplex transmissions from separate transmitters on two distinct multiple access time slots 525 may be received on their respective multiple access time slots 530.

Figure 6A:
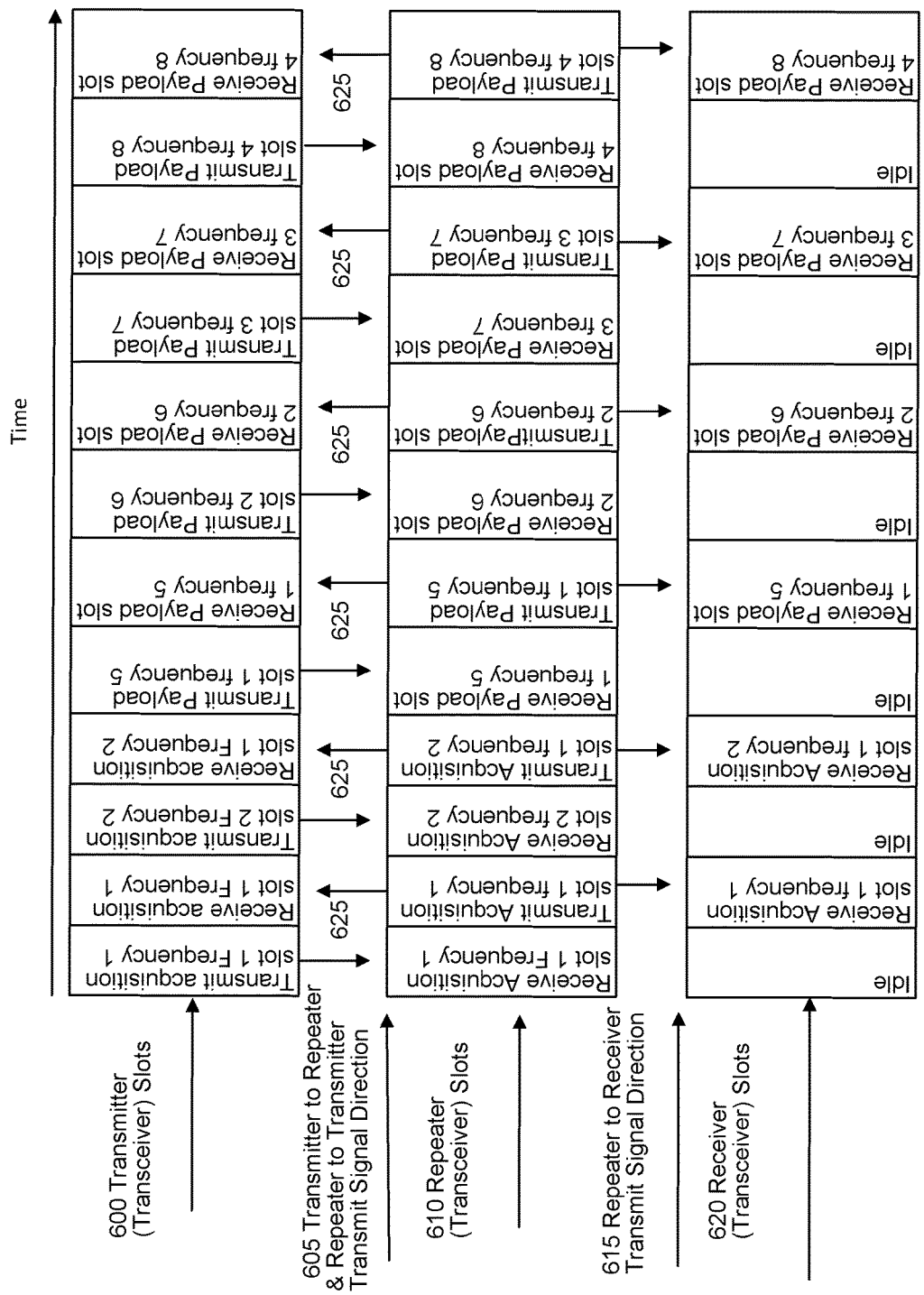
FIG. 6A illustrates an exemplary block diagram embodiment of one single hop frame showing time, frequencies, and signal direction for a transmitter, repeater and receiver utilizing the method as described in FIGS. 1A to 3B within a time division duplex system, in accordance with an embodiment of the invention.

With reference to FIGS. 1 to 3B, and 6A, FIG. 6A illustrates an exemplary block diagram embodiment of one single hop frame showing time, frequencies, and signal direction for a transmitter, repeater and receiver utilizing the method as described in FIGS. 1A to 3B within a time division duplex system, in accordance with an embodiment of the invention. With reference to FIGS. 1A, 1B, and 6A, for time division duplex operation each slot in the hopping pattern as determined from FIGS. 1A and 1B may be divided to create separate time division duplex, transmit and receive sub-slots as depicted in FIG. 6A items 600, 610, and 620. The transmit and receive time division duplex sub-slot functions may be reversed in time in a repeater 610 with reference to a transmitter 600 and a receiver 620 causing a time division duplex effect shown in the signal direction between the transmitter 600 and a repeater 605 and repeater to a receiver 620 in 615. The receiver 620, may receive transmissions from the repeater transmit slots 615 and optionally may receive transmissions from the transmitter transmit slots 600 in order to switch to the strongest signal based on RSSI or slot misses, for example, without limitation, if repeater 610 is out of range but Transmitter 600 is in range or vise versa. The transmitting transceiver 600 may optionally receive transmissions from the repeater transmit slots 625 during a receive slot window.

Figure 6B:
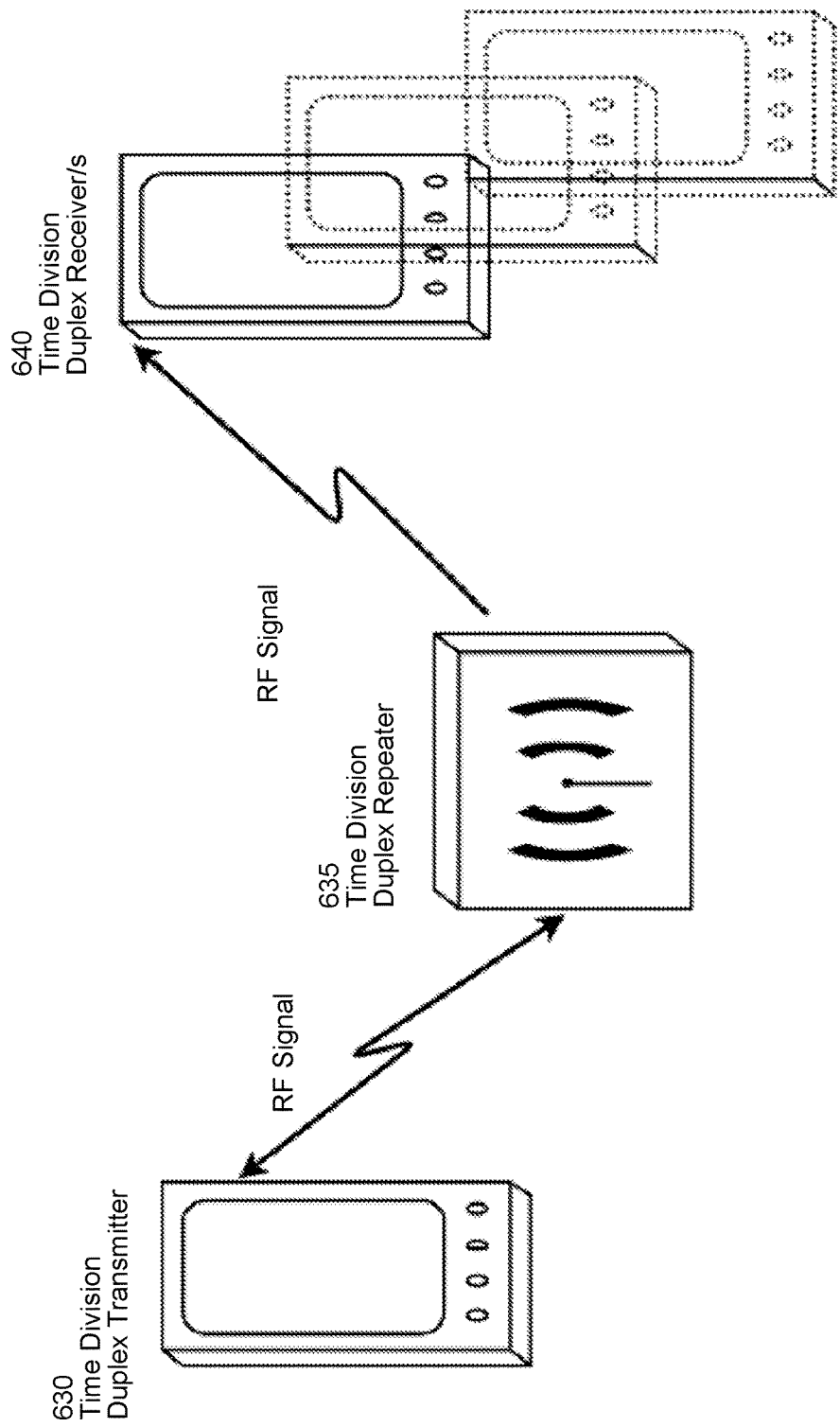
FIG. 6B illustrates exemplary radio transceivers implementing the method described in FIG. 6A, in accordance with an embodiment of the invention.

With reference to FIGS. 6A and 6B, FIG. 6B illustrates exemplary radio transceivers implementing the method described in FIG. 6A, in accordance with an embodiment of the invention. Frequency hopping time division duplex transmissions from a transmitter 630 may be received by a repeater 635. The repeater 635 then may re-transmit to receiver/s 640 and optionally back to the transmitting transceivers receiver 630.

Figure 7A:
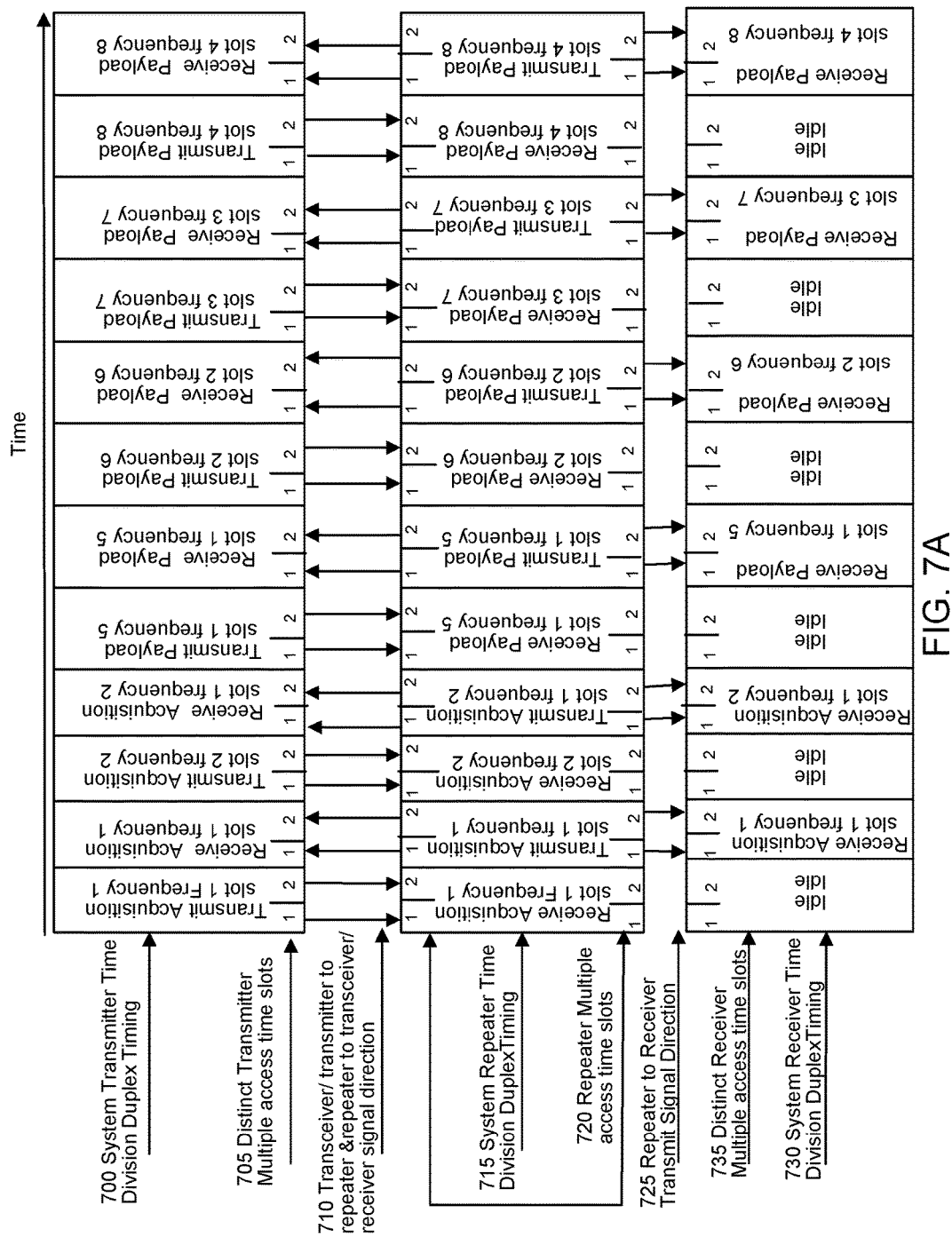
FIG. 7A illustrates an exemplary block diagram of a single hop frame showing time, frequencies, and signal direction for two distinct transmitters, one repeater and two distinct receivers utilizing the method as described in the detailed descriptions for FIGS. 1A to 3B above within a two channel time division duplex and multiple access system, in accordance with an embodiment of the invention.

With reference to FIGS. 1A to 3B and 7A, FIG. 7A illustrates an exemplary block diagram of a single hop frame showing time, frequencies, and signal direction for two distinct transmitters, one repeater and two distinct receivers utilizing the method as described in the detailed descriptions for FIGS. 1A to 3B above within a two-channel time division duplex and multiple access system, in accordance with an embodiment of the invention. With reference to FIGS. 1A, 1B, and 7A, for time division duplex with multiple access operation each slot in a hopping pattern as determined from FIGS. 1A and 1B may be divided to create separate time division duplex slots 700, 715, and 730 which may be further partitioned to create multiple access slots 705, 720, and 735. Transmit and receive time division duplex slot functions may be reversed in time in a repeater 715 with reference to a transmitter and a receiver, 700 and 730, causing a time division duplex effect shown in the signal direction between the transmitter and a repeater in 710 and a repeater to receiver in 725. Each multiple access transmitter slot from 2 up to 1000 705 may be received by a corresponding repeater multiple access slot matching the transmitter multiple access slots from 2 up to 1000 705 which may then be transmitted from the repeater on a corresponding time slots 710 and 725. Each receiver may receive transmissions from the repeater transmit slots on its assigned multiple access time slots matching the transmitter 705 and repeater 720 multiple access slots from 2 up to 1000 735. Each transmitting transceiver may optionally receive transmissions from the repeater transmit slots on its assigned multiple access time slot 710 and optionally may receive transmissions from the transmitter transmit slots 700 and matching transmitter multiple access slots from 2 up to 1000 705 in order to switch to the strongest signal based on RSSI or slot misses, for example if repeater 715 is out of range but Transmitter 700 is in range or vise versa.

Figure 7B:
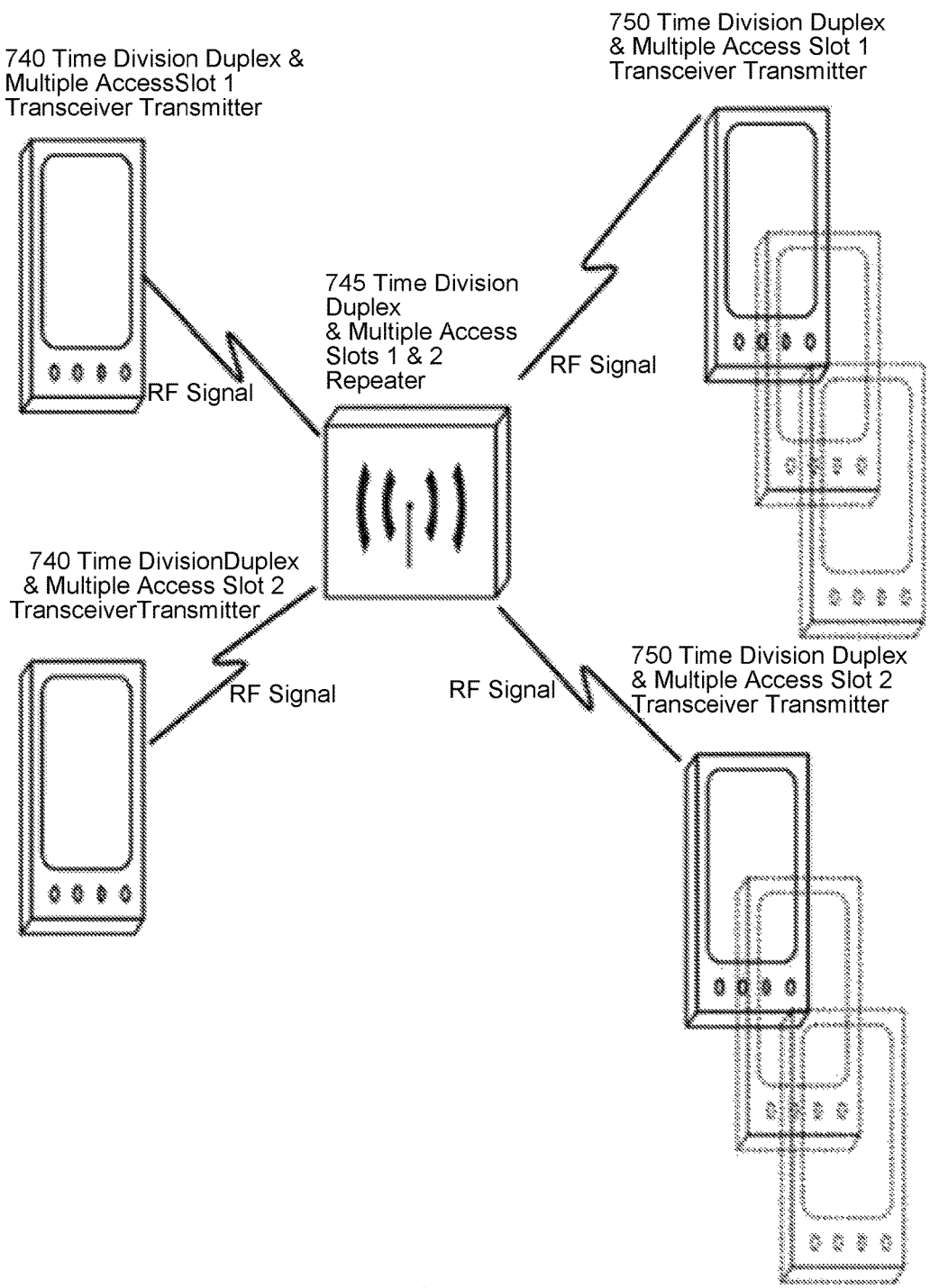
FIG. 7B shows exemplary radio transceivers implementing the method described in 7A, in accordance with an embodiment of the invention.

With reference to FIGS. 7A and 7B, FIG. 7B shows exemplary radio transceivers implementing the method described in 7A, in accordance with an embodiment of the invention. Frequency hopping time division duplex with multiple access transmissions from slot 1 and or slot 2 transceiver/transmitter 740 may be received by a repeater 745 during the repeater's time division duplex receive window on their respective multiple access time slots. The repeater 745 then may re-transmit data to the transceiver/receiver/s 750 during the transceiver time division duplex receive window on their respective multiple access time slot and optionally back to the transmitting transceivers receiver 740.

With reference to FIGS. 6A and 7A a repeater bridge is possible by re-transmitting received data during the receivers (transceiver) 620 or 730 idle slot either on the same hopset frequencies or separate hopset frequencies depending on interference potential and regulatory requirements, turning the receiver into a bridged/networked repeater without the need for external back-haul equipment. In this way repeaters can be configured in daisy chain or star networks or a combination of both, allowing subscriber transceivers to communicate seamlessly while in range of different repeaters without the need for additional back-haul equipment.

Figure 8:
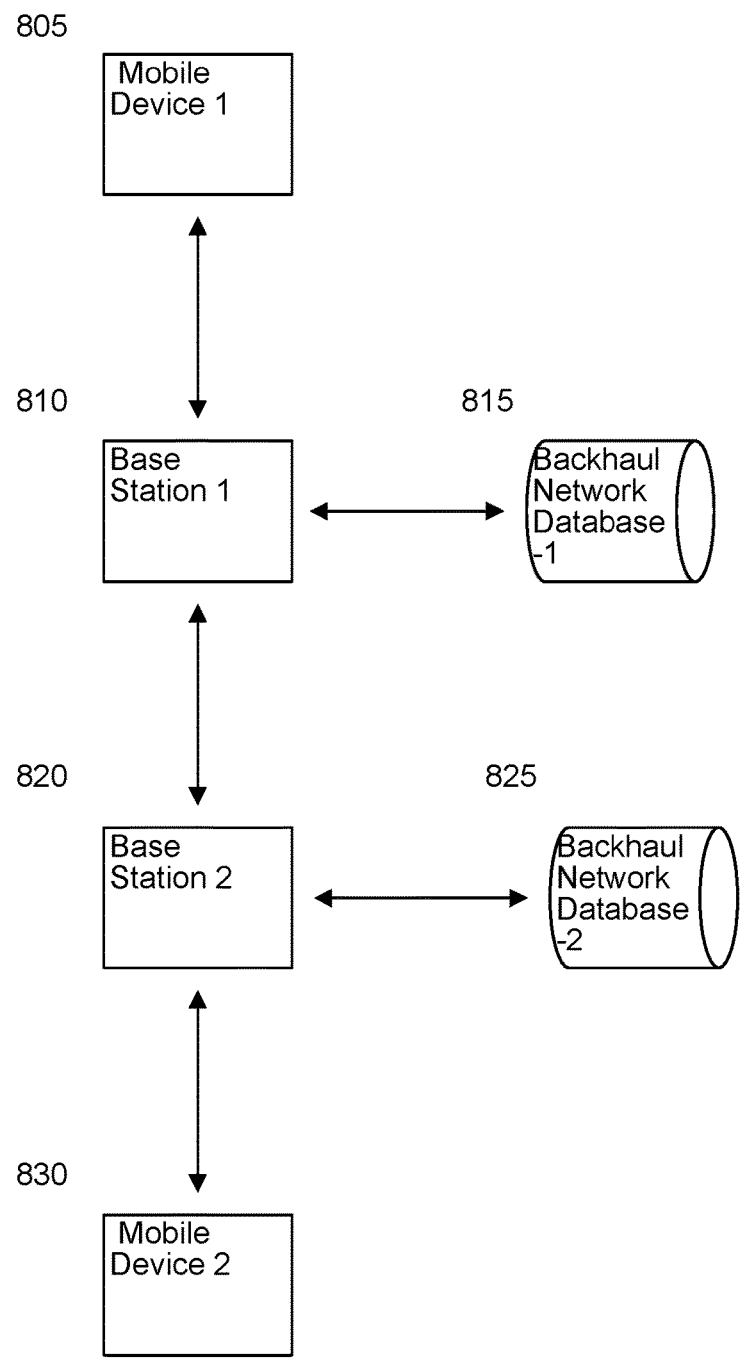
FIG. 8 illustrates an exemplary software system modules architecture diagram, in accordance with an embodiment of the invention.

FIG. 8 illustrates an exemplary software system modules architecture diagram, in accordance with an embodiment of the invention. A Mobile Device 805 may initiate communication by sending a communication signal to a local base station, Base Station-1 810. Base station-1 810 may access a Backhaul Network Database-1 815 in order to determine how to process the communication signal and look up relevant data needed to pass on the communication signal. The communication signal may be sent to a destination base station, Base Station-2 820, nearest to a destination mobile device, Mobile Device-2 830. Base Station-2 820 may access a local Backhaul Network Database-2 825 in order to determine how to process the communication signal and look up relevant data needed to pass on the communication signal. Finally, a destination mobile device, Mobile Device-2 830 may receive the signal sent by Mobile Device-1 805.

Figure 9:
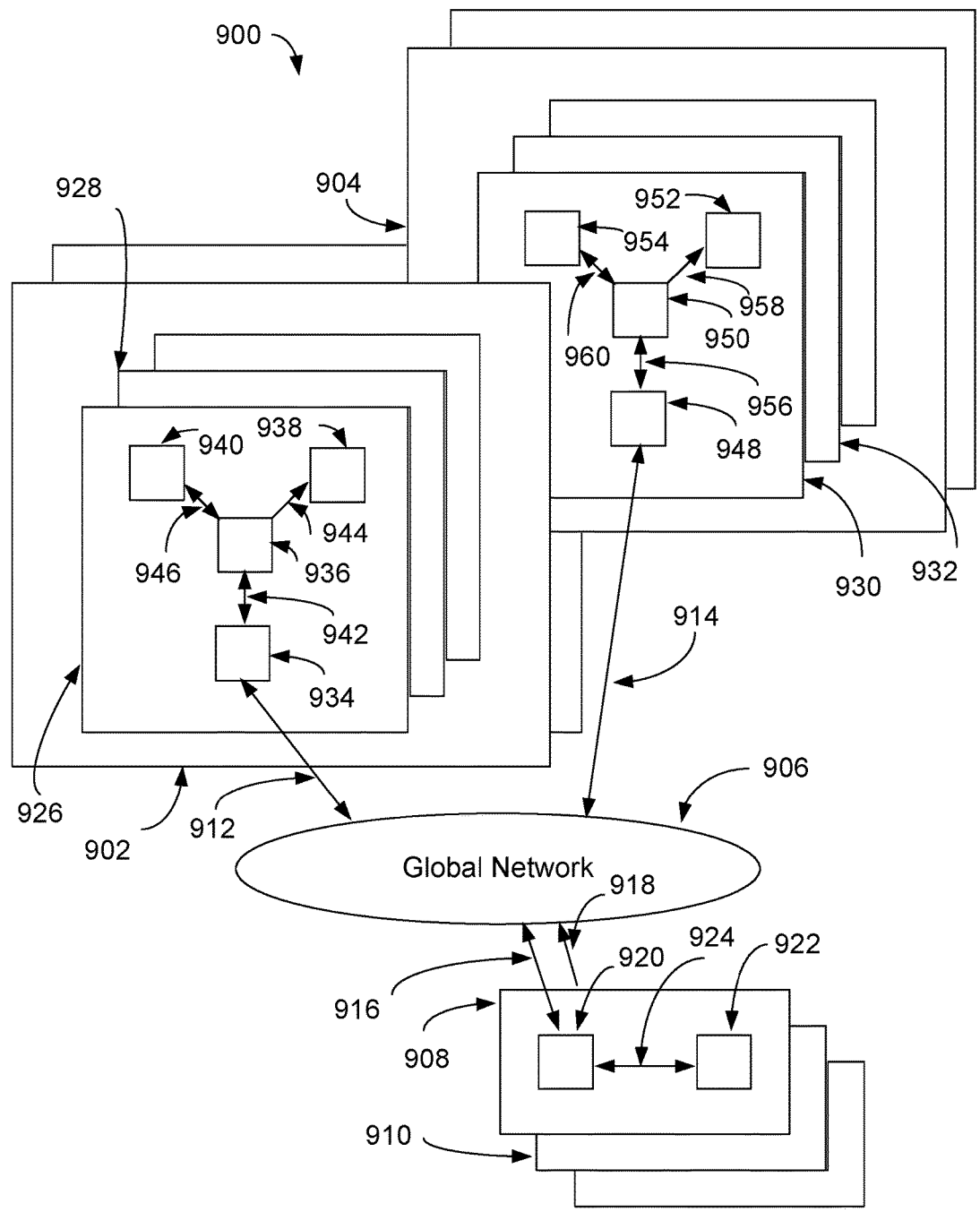
FIG. 9 illustrates a block diagram depicting a conventional client/server communication system, which may be used by an exemplary web-enabled/networked embodiment of the present invention.

FIG. 9 illustrates a block diagram depicting a conventional client/server communication system, which may be used by an exemplary web-enabled/networked embodiment of the present invention.

A communication system 900 includes a multiplicity of networked regions with a sampling of regions denoted as a network region 902 and a network region 904, a global network 906 and a multiplicity of servers with a sampling of servers denoted as a server device 908 and a server device 910.

Network region 902 and network region 904 may operate to represent a network contained within a geographical area or region. Non-limiting examples of representations for the geographical areas for the networked regions may include postal zip codes, telephone area codes, states, counties, cities and countries. Elements within network region 902 and 904 may operate to communicate with external elements within other networked regions or within elements contained within the same network region.

In some implementations, global network 906 may operate as the Internet. It will be understood by those skilled in the art that communication system 900 may take many different forms. Non-limiting examples of forms for communication system 900 include local area networks (LANs), wide area networks (WANs), wired telephone networks, cellular telephone networks, land mobile radio networks or any other network supporting data communication between respective entities via hardwired or wireless communication networks. Global network 906 may operate to transfer information between the various networked elements.

Server device 908 and server device 910 may operate to execute software instructions, store information, support database operations and communicate with other networked elements. Non-limiting examples of software and scripting languages which may be executed on server device 908 and server device 910 include C, C++, C# and Java.

Network region 902 may operate to communicate bi-directionally with global network 906 via a communication channel 912. Network region 904 may operate to communicate bi-directionally with global network 906 via a communication channel 914. Server device 908 may operate to communicate bi-directionally with global network 906 via a communication channel 916. Server device 910 may operate to communicate bi-directionally with global network 906 via a communication channel 918. Network region 902 and 904, global network 906 and server devices 908 and 910 may operate to communicate with each other and with every other networked device located within communication system 900.

Server device 908 includes a networking device 920 and a server 922. Networking device 920 may operate to communicate bi-directionally with global network 906 via communication channel 916 and with server 922 via a communication channel 924. Server 922 may operate to execute software instructions and store information.

Network region 902 includes a multiplicity of clients with a sampling denoted as a client 926 and a client 928. Client 926 includes a networking device 934, a processor 936, a GUI 938 and an interface device 940. Non-limiting examples of devices for GUI 938 include monitors, televisions, cellular telephones, smartphones and PDAs (Personal Digital Assistants). Non-limiting examples of interface device 940 include pointing device, mouse, trackball, scanner and printer. Networking device 934 may communicate bi-directionally with global network 906 via communication channel 912 and with processor 936 via a communication channel 942. GUI 938 may receive information from processor 936 via a communication channel 944 for presentation to a user for viewing. Interface device 940 may operate to send control information to processor 936 and to receive information from processor 936 via a communication channel 946. Network region 904 includes a multiplicity of clients with a sampling denoted as a client 930 and a client 932. Client 930 includes a networking device 948, a processor 950, a GUI 952 and an interface device 954. Non-limiting examples of devices for GUI 938 include monitors, televisions, cellular telephones, smartphones and PDAs (Personal Digital Assistants). Non-limiting examples of interface device 940 include pointing devices, mousse, trackballs, scanners and printers. Networking device 948 may communicate bi-directionally with global network 906 via communication channel 914 and with processor 950 via a communication channel 956. GUI 952 may receive information from processor 950 via a communication channel 958 for presentation to a user for viewing. Interface device 954 may operate to send control information to processor 950 and to receive information from processor 950 via a communication channel 960.

For example, consider the case where a user interfacing with client 926 may want to execute a networked application. A user may enter the IP (Internet Protocol) address for the networked application using interface device 940. The IP address information may be communicated to processor 936 via communication channel 946. Processor 936 may then communicate the IP address information to networking device 934 via communication channel 942. Networking device 934 may then communicate the IP address information to global network 906 via communication channel 912. Global network 906 may then communicate the IP address information to networking device 920 of server device 908 via communication channel 916. Networking device 920 may then communicate the IP address information to server 922 via communication channel 924. Server 922 may receive the IP address information and after processing the IP address information may communicate return information to networking device 920 via communication channel 924. Networking device 920 may communicate the return information to global network 906 via communication channel 916. Global network 906 may communicate the return information to networking device 934 via communication channel 912. Networking device 934 may communicate the return information to processor 936 via communication channel 942. Processor 976 may communicate the return information to GUI 978 via communication channel 944. User may then view the return information on GUI 938.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 10:
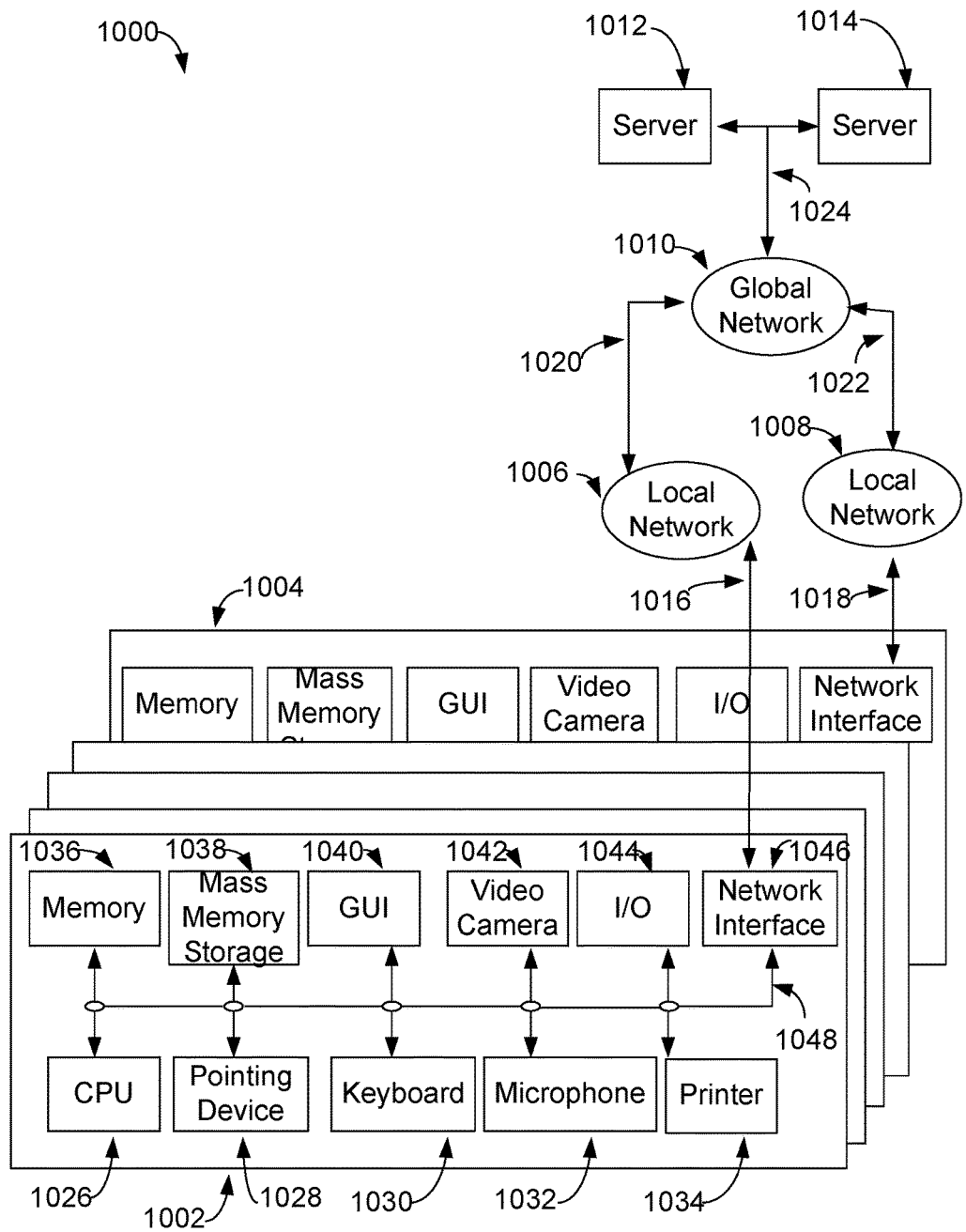
FIG. 10 is a block diagram depicting an exemplary client/server system which may be used by an exemplary web-enabled/networked embodiment of the present invention.

FIG. 10 is a block diagram depicting an exemplary client/server system which may be used by an exemplary web-enabled/networked embodiment of the present invention.

A communication system 1000 includes a multiplicity of clients with a sampling of clients denoted as a client 1002 and a client 1004, a multiplicity of local networks with a sampling of networks denoted as a local network 1006 and a local network 1008, a global network 1010 and a multiplicity of servers with a sampling of servers denoted as a server 1012 and a server 1014.

Client 1002 may communicate bi-directionally with local network 1006 via a communication channel 1016. Client 1004 may communicate bi-directionally with local network 1008 via a communication channel 1018. Local network 1006 may communicate bi-directionally with global network 1010 via a communication channel 1020. Local network 1008 may communicate bi-directionally with global network 1010 via a communication channel 1022. Global network 1010 may communicate bi-directionally with server 1012 and server 1014 via a communication channel 1024. Server 1012 and server 1014 may communicate bi-directionally with each other via communication channel 1024. Furthermore, clients 1002, 1004, local networks 1006, 1008, global network 1010 and servers 1012, 1014 may each communicate bi-directionally with each other.

In one embodiment, global network 1010 may operate as the Internet. It will be understood by those skilled in the art that communication system 1000 may take many different forms. Non-limiting examples of forms for communication system 1000 include local area networks (LANs), wide area networks (WANs), wired telephone networks, wireless networks, or any other network supporting data communication between respective entities.

Clients 1002 and 1004 may take many different forms. Non-limiting examples of clients 1002 and 1004 include personal computers, personal digital assistants (PDAs), cellular phones and smartphones.

Client 1002 includes a CPU 1026, a pointing device 1028, a keyboard 1030, a microphone 1032, a printer 1034, a memory 1036, a mass memory storage 1038, a GUI 1040, a video camera 1042, an input/output interface 1044 and a network interface 1046.

CPU 1026, pointing device 1028, keyboard 1030, microphone 1032, printer 1034, memory 1036, mass memory storage 1038, GUI 1040, video camera 1042, input/output interface 1044 and network interface 1046 may communicate in a unidirectional manner or a bi-directional manner with each other via a communication channel 1048. Communication channel 1048 may be configured as a single communication channel or a multiplicity of communication channels.

CPU 1026 may be comprised of a single processor or multiple processors. CPU 1026 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 1036 is used typically to transfer data and instructions to CPU 1026 in a bi-directional manner. Memory 1036, as discussed previously, may include any suitable computer-readable media, intended for data storage, such as those described above excluding any wired or wireless transmissions unless specifically noted. Mass memory storage 1038 may also be coupled bi-directionally to CPU 1026 and provides additional data storage capacity and may include any of the computer-readable media described above. Mass memory storage 1038 may be used to store programs, data and the like and is typically a secondary storage medium such as a hard disk. It will be appreciated that the information retained within mass memory storage 1038, may, in appropriate cases, be incorporated in standard fashion as part of memory 1036 as virtual memory.

CPU 1026 may be coupled to GUI 1040. GUI 1040 enables a user to view the operation of computer operating system and software. CPU 1026 may be coupled to pointing device 1028. Non-limiting examples of pointing device 1028 include computer mouse, trackball and touchpad. Pointing device 1028 enables a user with the capability to maneuver a computer cursor about the viewing area of GUI 1040 and select areas or features in the viewing area of GUI 1040. CPU 1026 may be coupled to keyboard 1030. Keyboard 1030 enables a user with the capability to input alphanumeric textual information to CPU 1026. CPU 1026 may be coupled to microphone 1032. Microphone 1032 enables audio produced by a user to be recorded, processed and communicated by CPU 1026. CPU 1026 may be connected to printer 1034. Printer 1034 enables a user with the capability to print information to a sheet of paper. CPU 1026 may be connected to video camera 1042. Video camera 1042 enables video produced or captured by user to be recorded, processed and communicated by CPU 1026.

CPU 1026 may also be coupled to input/output interface 1044 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1026 optionally may be coupled to network interface 1046 which enables communication with an external device such as a database or a computer or telecommunications or internet network using an external connection shown generally as communication channel 1016, which may be implemented as a hardwired or wireless communications link using suitable conventional technologies. With such a connection, CPU 1026 might receive information from the network, or might output information to a network in the course of performing the method steps described in the teachings of the present invention.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6).

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breath life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing radio communication according to the present invention will be apparent to those skilled in the art. Various aspects of the invention have been described above by way of illustration, and the specific embodiments disclosed are not intended to limit the invention to the particular forms disclosed. The particular implementation of the radio communication may vary depending upon the particular context or application. By way of example, and not limitation, the radio communication described in the foregoing were principally directed to radio communication synchronization implementations; however, similar techniques may instead be applied to RF integrated circuits, RF system on a chip, smart phone or computer programs, firmware and applications, cordless telephones, wireless alarm systems, two way radio hardware and software, telemetry and SCADA devices, cellular telephone hardware and software, wireless headset hardware and software, remote control devices, remote audio devises, internet-of-things devices, wireless transmitters/receivers/transceivers/repeaters, access points and bridges, vehicular repeaters, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A method of synchronizing frequency hopping transmitters, receivers, transceivers, repeaters and other radio networks utilizing non-coordinated shared frequencies within regional, US and international ISM (Industrial, Scientific and Medical) bands comprising:

synchronizing communications between at least one transmitting and at least one receiving device utilizing a pool of frequencies consisting of a first group of frequencies being assigned to transmit for a specific duration per frequency per transmission and a second group of frequencies in which the total number of frequencies is a paired first factor of the first group's total number of frequencies or a paired first factor of any factor of the first group's total number of frequencies and which is then divided into transmit slots, a transmit duration of said second group of frequencies being a fraction of said specific duration of transmission of said first group of frequencies and also being the corresponding paired second factor of the first groups total number of frequencies or a corresponding paired second factor of a factor of the first group's total number of frequencies according to which product was chosen to calculate the first factor.

2. The method of claim 1, further comprising the step of calculating a ratio by multiplying the two factors used to determine the slots for the second group of frequencies (total number of frequencies and transmit duration divisor) compared to the number of frequencies in the first group according to claim 1.

3. The method of claim 2, further comprising the step of Interleaving the second group of frequencies and durations (the slots) with the first group of frequencies and durations according to said ratio.

4. The method of claim 3, further comprising the step of Structuring a hopping pattern such that at the end of the hop cycle all frequencies will have been transmitted upon evenly.

5. The method of claim 4, wherein the second group of frequencies is distributed throughout the hop cycle and not in a single contiguously grouped period.

6. The method of claim 1, further comprising the step of Transmitting a first identifying data sequence on that second group of shorter duration frequencies (the slots) which is repeated consecutively for a minimum of the product of the intended receivers maximum tune time plus detect time for said data sequence multiplied by the total quantity of frequencies in said second group followed by optionally—a secondary network identification data sequence followed by some amount of hopping synchronization data.

7. The method of claim 4, further comprising the step of one or more receivers scanning for a first identifying data sequence according to claim 6 on the second group of frequencies.

8. The method of claim 7, further comprising the step of upon valid detection of network identification data, said receiver continues receiving on said frequency to detect optional secondary network identification data sequence followed by some amount of hopping synchronization data transmitted if valid secondary system identification and hopping synchronization is not decoded—receiver uses pre-determined dwell timer to resume scanning.

9. The method of claim 8, wherein hopping synchronization data received from the second group of frequencies is used to synchronize with the hopping pattern and begin receiving payload data on the first group of frequencies.

* * * * *